United States Patent
Tatapudi et al.

(10) Patent No.: US 7,739,423 B2
(45) Date of Patent: Jun. 15, 2010

(54) BULK TRANSFER OF INFORMATION ON NETWORK DEVICE

(75) Inventors: Vamsi Tatapudi, Santa Clara, CA (US); Shashi S. Math, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 230 days.

(21) Appl. No.: 11/082,976

(22) Filed: Mar. 18, 2005

(65) Prior Publication Data

US 2006/0129742 A1    Jun. 15, 2006

Related U.S. Application Data

(60) Provisional application No. 60/631,576, filed on Nov. 30, 2004.

(51) Int. Cl.
*G06F 15/177* (2006.01)
*G06F 13/28* (2006.01)
*G06F 12/00* (2006.01)
*G06F 12/06* (2006.01)

(52) U.S. Cl. ............................. 710/26; 709/220; 711/5
(58) Field of Classification Search ..................... 711/5
See application file for complete search history.

(56) References Cited

U.S. PATENT DOCUMENTS 5,182,801 A * 1/1993 Asfour ....................... 709/214
5,604,853 A * 2/1997 Nagashima ................. 715/210
7,167,678 B2 * 1/2007 Powers ....................... 455/41.2
2004/0139274 A1 * 7/2004 Hui ............................ 711/108
2004/0186931 A1 * 9/2004 Maine ......................... 710/22
2005/0021884 A1 * 1/2005 Jeddeloh ..................... 710/22

* cited by examiner

*Primary Examiner*—Brian R Peugh
*Assistant Examiner*—Gary W Cygiel (57) ABSTRACT

A network device for processing packets. The network device includes a CPU processing module for transmitting information between at least one memory location on the network device and an external CPU memory location. The CPU processing module includes a first engine for performing bulk transfer of information from the at least one memory location on the network device to the external CPU memory location, wherein all entries of the at least one memory location on the network device are transferred to the external CPU memory location, and a second engine for performing bulk transfer of information from the external CPU memory location to at least one memory location on the switching chip, wherein a plurality of entries from the external CPU memory location is transferred to the memory locations on the switching chip. The second engine uses a bit received from a CPU to determine how entries will be added in the at least one memory location on the switching chip.

18 Claims, 5 Drawing Sheets

BULK TRANSFER OF INFORMATION ON NETWORK DEVICE

This application claims priority of U.S. Provisional Patent Applications Ser. No. 60/631,576, filed on Nov. 30, 2004. The subject matter of the earlier filed application is hereby incorporated by reference.

BACKGROUND OF THE INVENTION

1. Field of the Invention

The present invention relates to a method of accessing memory locations on a network device and more particularly for reading and writing information from a CPU to a memory location on the network device.

2. Description of the Related Art

A switching system may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs. Some devices also include a CPU processing module through which the device interfaces with external CPU ports.

As packets enter the device from multiple ports, they are forwarded to the ingress module where switching and other processing are performed on the packets. Thereafter, the packets are transmitted to the MMU. After performing resource checks on the packets, the MMU transmits the packets to the egress module for further processing and modification. Thereafter, the egress module transmits the packets to at least one destination port, including a CPU port. If the packets are being transmitted to the CPU port, the egress module forwards them through a CPU processing module which transmits the packet to the CPU via the PCI bus.

Each of the ingress module, the MMU, and the egress module includes one or more internal Random Access Memory (RAM) and Content Addressable Memory (CAM) for storing information. For example, the ingress and egress modules may store lookup tables with switching information in the internal RAM/CAM. When the device is initialized, information is stored in each RAM and/or CAM. During normal processing, the information in one or more RAM/CAM may be updated either by the device or by the CPU. To synchronize the information stored in the RAM/CAM with the information stored on the CPU, the CPU may need to access and/or update the information stored in one or more RAM and/or CAM. Previous designs enabled the CPU to obtain all of the information from a RAM/CAM in a bulk transfer operation, i.e., read all of the information at one time. However, these designs provided no bulk transfer write operations from the CPU to the device. Moreover, the bulk read transfer operation was only available on some tables.

As such, if the CPU had to insert and/or delete an entry in a RAM and/or CAM, a table DMA engine in the CPU processing module copied all entries from the table to the CPU. Upon modifying the table, the CPU transmitted one entry at a time to the RAM/CAM to be modified. For a RAM/CAM with a large amount of entries, this operation is not only slow, it is costly since numerous write operations are required in order to update one entry in the RAM/CAM.

SUMMARY OF THE INVENTION

According to one aspect of the invention, there is provided a network device for processing packets. The network device includes a CPU processing module for transmitting information between at least one memory location on the network device and an external CPU memory location. The CPU processing module includes a first engine for performing bulk transfer of information from the at least one memory location on the network device to the external CPU memory location, wherein all entries of the at least one memory location on the network device are transferred to the external CPU memory location, and a second engine for performing bulk transfer of information from the external CPU memory location to at least one memory location on the switching chip, wherein a plurality of entries from the external CPU memory location is transferred to the memory locations on the switching chip. The second engine uses a bit received from a CPU to determine how entries will be added in the at least one memory location on the switching chip.

According to another aspect of the invention, there is provided a method chip for processing packets in a network device. The method includes the steps of performing at least one of a first bulk transfer of information from at least one memory location on the network device to an external CPU memory location, wherein all entries of the at least one memory location on the network device are transferred to the external CPU memory location; or a second bulk transfer of information from the external CPU memory location to at least one memory location on the switching chip, wherein a plurality of entries from the external CPU memory location is transferred to the memory locations on the switching chip. The method also includes the step of receiving a bit from a CPU during the second bulk transfer to determine how entries will be added in the at least one memory location on the switching chip.

According to another aspect of the invention, there is provided an apparatus for processing packets in a network device. The apparatus includes performing means for performing at least one of a first bulk transfer of information from at least one memory location on the network device to an external CPU memory location, wherein all entries of the at least one memory location on the network device are transferred to the external CPU memory location, or a second bulk transfer of information from the external CPU memory location to at least one memory location on the switching chip, wherein a plurality of entries from the external CPU memory location is transferred to the memory locations on the switching chip. The apparatus also includes receiving means for receiving a bit from a CPU during the second bulk transfer to determine how entries will be added in the at least one memory location on the switching chip.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
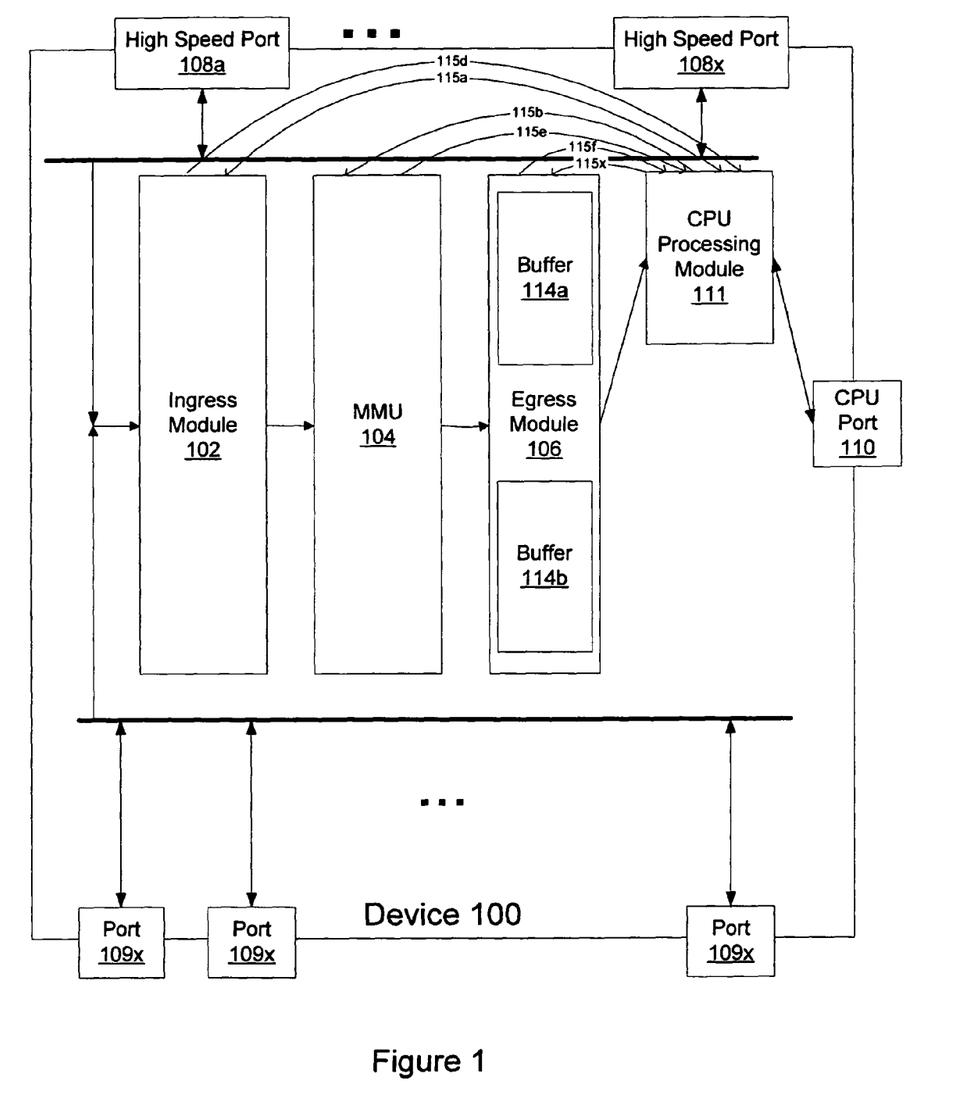
FIG. 1 illustrates a network device in which an embodiment the present invention may be implemented.

FIG. 1 illustrates a network device, such as a switching chip, in which an embodiment the present invention may be implemented. Chip 100 implements a pipelined approach to process incoming packets and includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module.

Chip 100 may also include one or more internal fabric high speed ports, such as HiGig ports, 108a-108x, one or more external Ethernet ports 109a-109x, and a CPU port 110. High speed ports 108a-108x are used to interconnect various switching chips in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Chip 100 interfaces with external/off-chip CPUs through a CPU processing module 111, for example a CMIC module, which interfaces with a PCI bus that connects device 100 to an external CPU. Chip 100 also includes multiple s-busses 115a-115x that connect each of ingress module 102, MMU 104 and egress module 106 to CPU processing module 111.

Figure 2:
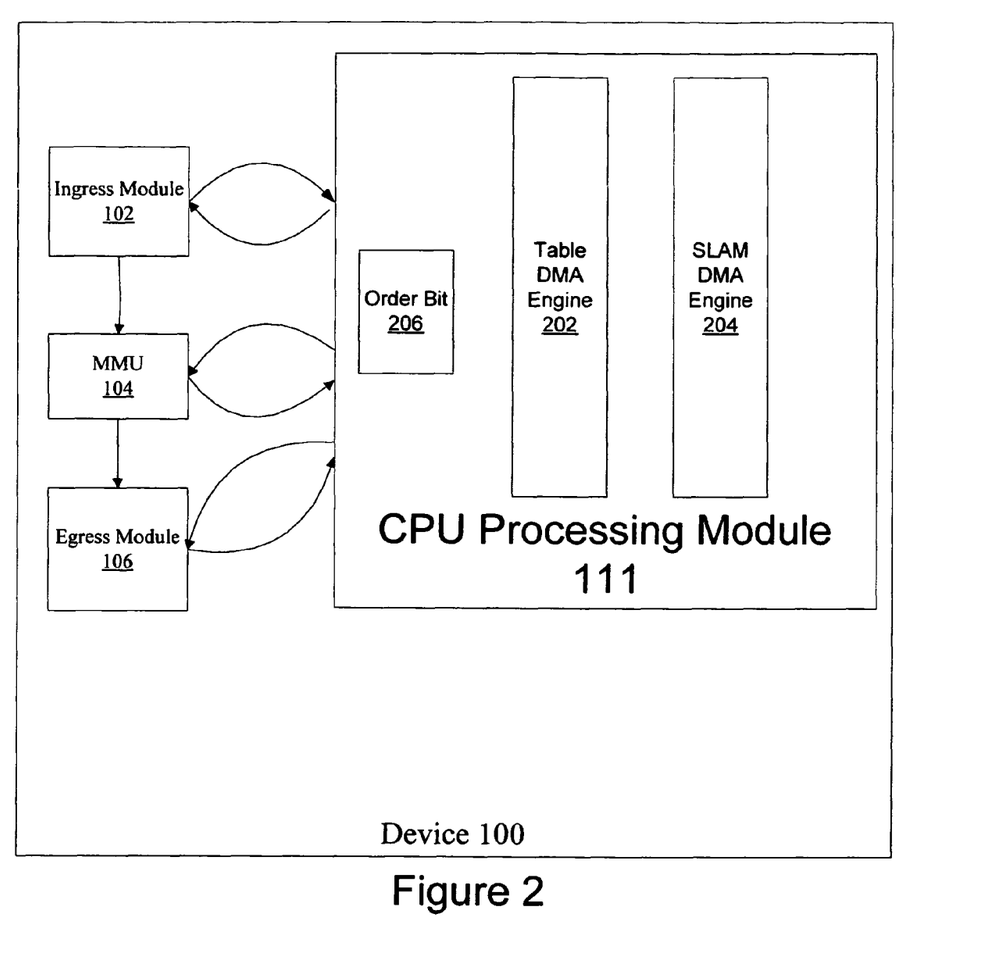
FIG. 2 illustrates an embodiment of the CPU processing module used in an embodiment of the invention.

FIG. 2 illustrates an embodiment of CPU processing module 111 used in an embodiment of the invention. CPU processing module 111 transmits information from memory locations in ingress module 102, MMU 104 and/or egress module 106 to an external CPU and copies information from the external CPU into memory locations in ingress module 102, MMU 104 and/or egress module 106. CPU processing module 111 includes a Table DMA Engine 202 and a SLAM DMA Engine 204. Table DMA Engine 202 is used for performing bulk transfer of information from memory locations in ingress module 102, MMU 104 and/or egress module 106 to the external CPU. SLAM DMA Engine 204 is used for performing bulk transfer of information from the external CPU to memory locations in ingress module 102, MMU 104 and/or egress module 106. CPU processing module also supports a CAM-SLAM-DMA order bit 206 that is set by the CPU during an insert or delete operation to tables in device 100. CAM-SLAM-DMA order bit 206 may be set for forward insertion when a value is being deleted from an entry in a table in the chip or for backward insertion when a value is being added to an entry in a table in the chip.

Figure 3A:
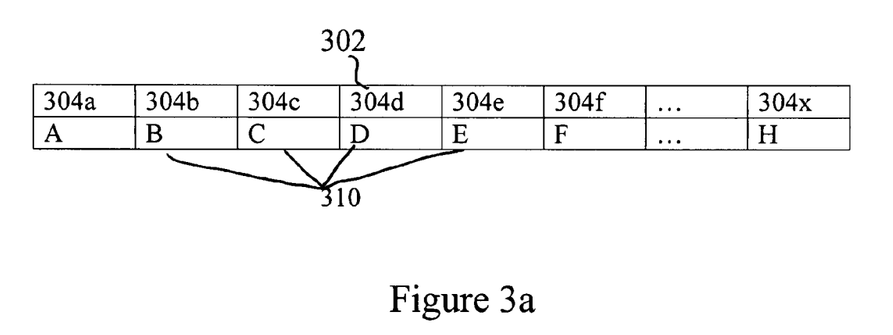
FIG. 3a illustrates an embodiment of a RAM for storing information in each of the ingress module, MMU and egress module.
Figure 3B:
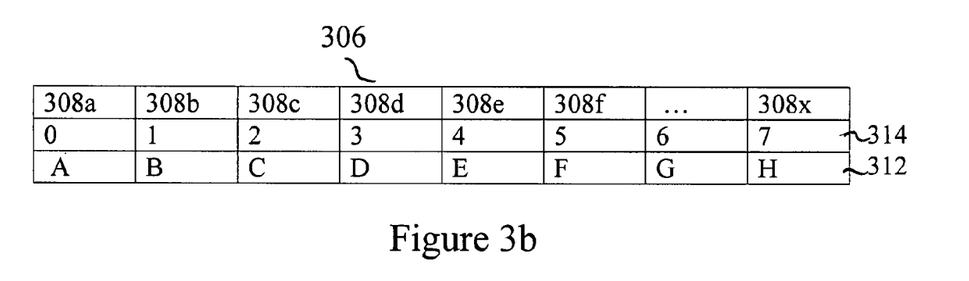
FIG. 3b illustrates an embodiment of a CAM for storing information in each of the ingress module, MMU and egress module.

Each of ingress module 102, MMU 104 and egress module 106 includes one or more Random Access Memory (RAM) and/or Content Addressable Memory (CAM) for storing information. For example, ingress module 102 includes a CAM L3-tunnel-table to enable a parser in the ingress module to determine if the incoming packet is a tunnelled IPv4 packet. Egress module 106 includes resources, such as registers, memories and/or stat counters that are accessed by the CPU. FIG. 3a illustrates an embodiment of a RAM for storing information in each of ingress module 102, MMU 104 and egress module 106 and FIG. 3b illustrates an embodiment of a CAM for storing information in each of ingress module 102, MMU 104 and egress module 106. RAM 302 includes entries 304a-304x that store data 310. CAM 306 includes entries 308a-308x that store data 312 and a corresponding key 314. During normal chip operation, RAM 302 and/or CAM 306 may need to be updated, wherein a value may need to be added or deleted from RAM 302 and/or CAM 306. As is known to one skilled in the art, if a value needs to be inserted into RAM 302 and/or CAM 306, starting from the bottom of the table, all values below the entry where the value is to be inserted is copied to the next entry. Thereafter, the entry where the new value is to be inserted will be a duplicate entry as the entry immediately below it and the new value is inserted over the duplicate entry. This operation is slow and expensive if RAM 302 and/or CAM 306 include a large number of entries.

According to one embodiment of the invention, if the values in RAM 302 and/or CAM 306 need to be updated, all of entries from RAM 302 and/or CAM 306 are transmitted from the appropriate location in ingress module 102, MMU 104 or egress module 106 to Table DMA Engine 202 via one of s-busses 115a-115x. Table DMA Engine 202 then transfers the entire table to a memory in the CPU via a PCI bus. The software associated with the CPU may thereafter modify values associated with the table. Thereafter, the CPU transmits to SLAM DMA Engine 204 the starting location of the table data structure in the PCI memory, the number of s-bus beats per entry, the number of entries to be updated and the starting s-bus address of the table. CAM 306 uses SLAM DMA Engine 204 for insert and delete operations since the entries of CAM 306 are almost always sorted. Entries in RAM 302 are not typically sorted and do not need to be sorted during insert and delete operations. Therefore, SLAM DMA Engine 204 is used by RAM 302 for the purpose of faster initialization. In an embodiment of the invention, the number of s-bus beats per entry is rounded up to the next 32 bit boundary and the number of entries may be up to sixteen million. The CPU also sets a CAM-SLAM-DMA-Order bit. Specifically, the CAM-SLAM-DMA order bit may be set for forward insertion when a value is being deleted from an entry in RAM 302 and/or CAM 306 or for backward insertion when a value is being added to an entry in RAM 302 and/or CAM 306. According to an embodiment, when the CAM-SLAM-DMA order bit is set for backward insertion, the starting s-bus address of the table is the last entry of the table rather than the first entry of the associated table.

The CAM data structure in the PCI memory is aligned to a 32-bit/4 byte boundary. For example, if CAM 306 from ingress module 206 is 100 bits wide, the software associated with the CPU allocates 128 bits and fills zeros in bits 101-128. When the entries of CAM 306 are transmitted from the CPU to ingress module 102, ingress module 102 has to accept 4 s-bus beats and discard bits 101-128.

Figure 4:
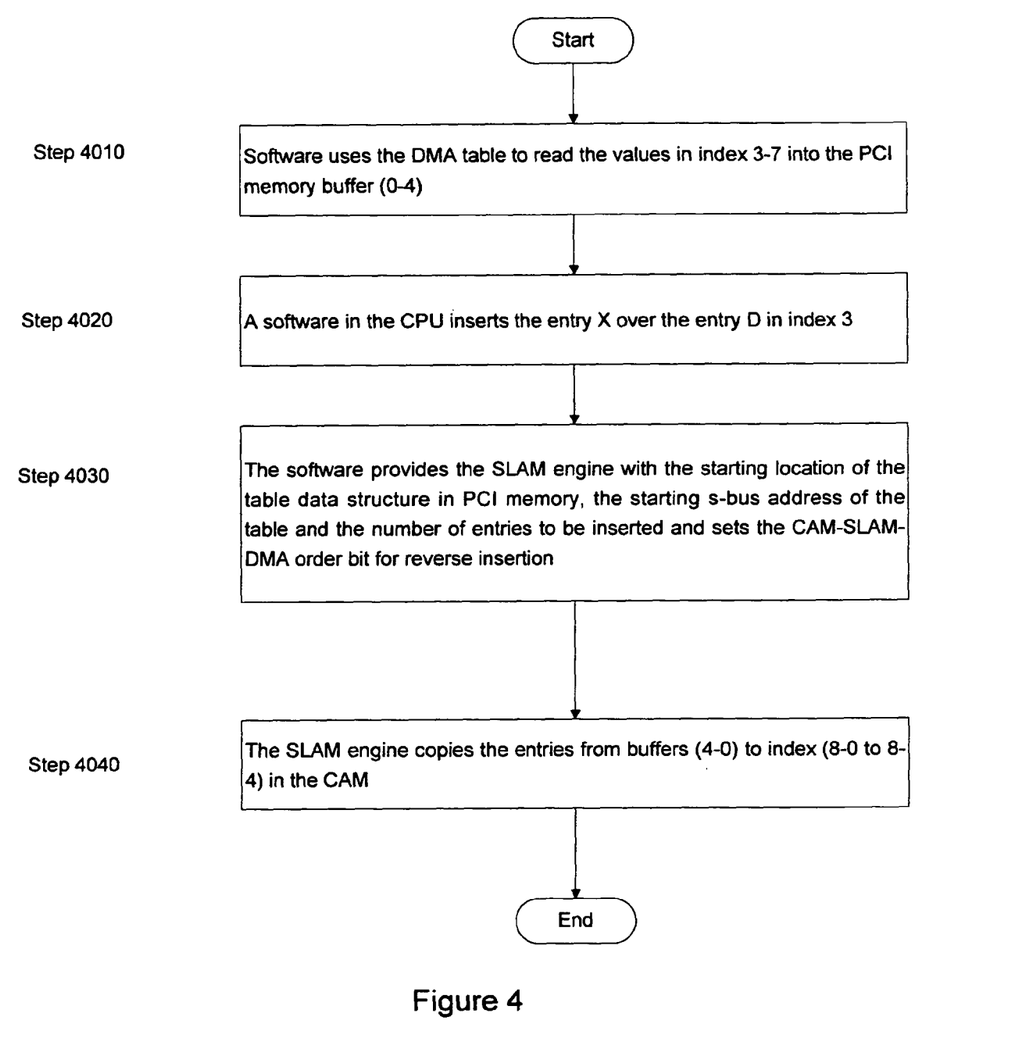
FIG. 4 illustrates the steps implemented during an insert operation to the CAM in an embodiment of the invention.

FIG. 4 illustrates the steps implemented during an insert operation to CAM 306 in an embodiment of the invention. To insert the value X at index 3 of CAM 306, in step 4010, software uses DMA table 202 to read the values in index 3-7, as illustrated in FIG. 3b, into the PCI memory buffer (0-4). In Step 4020, the software in the CPU inserts the entry X over the entry D in index 3. In Step 4030, the software in the CPU thereafter provides SLAM DMA Engine 204 with the starting location of the table data structure in PCI memory, i.e., a pointer to buffer (4) in the PCI memory, the starting s-bus address of the table, i.e, a pointer to index 8, and the number of entries to be inserted, i.e., 5 entries including the starting and ending entries. The software sets the CAM-SLAM-DMA order bit for reverse insertion. In Step 4040, SLAM DMA Engine 204 copies the entry from PCI buffer (4) to index (8-0) in CAM 306, the entry from PCI buffer (3) to index (8-1) in CAM 306, the entry from PCI buffer (2) to index (8-2) in CAM 306, the entry from PCI buffer (1) to index (8-1) in CAM 306 and the entry from buffer (0) to index (8-4) in CAM 306.

Figure 5:
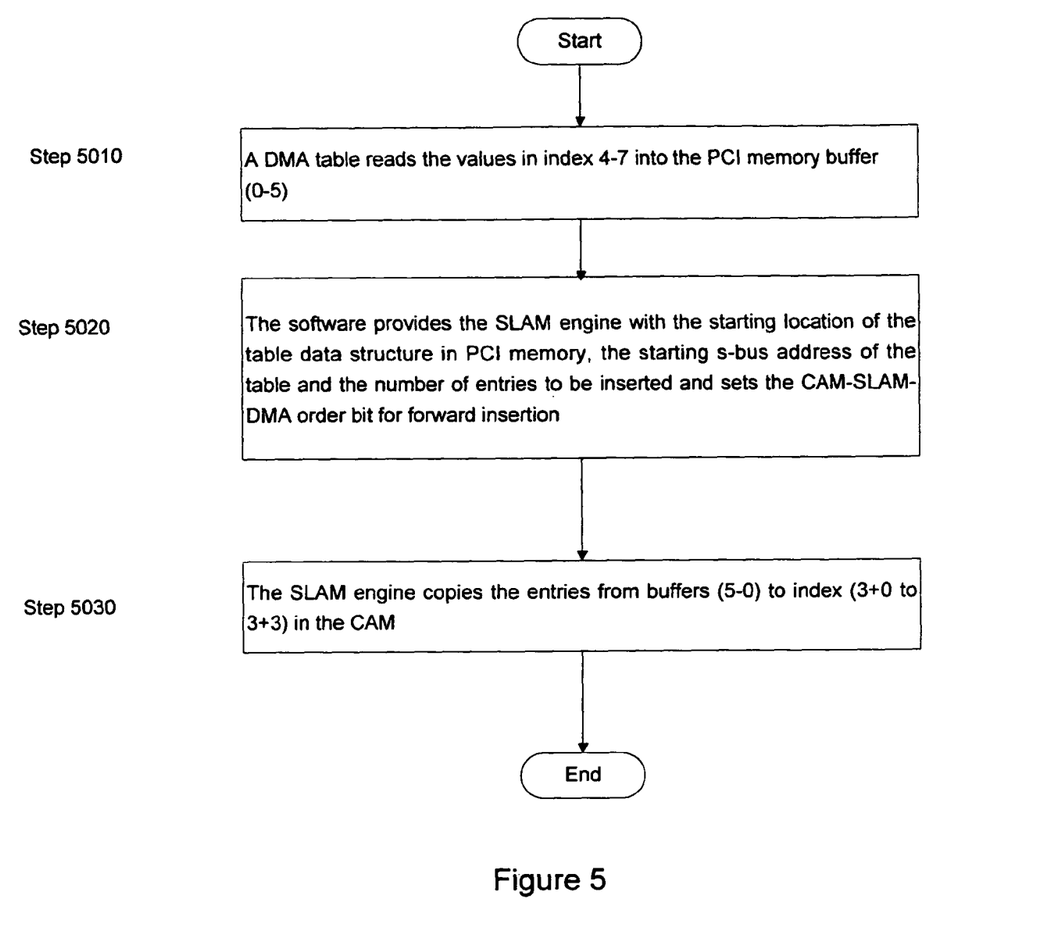
FIG. 5 illustrates the steps implemented during a delete operation to the CAM in an embodiment of the invention.

FIG. 5 illustrates the steps implemented during a delete operation to CAM 306 in an embodiment of the invention. To delete the value D at index 3 of CAM 306, in step 5010, software uses DMA table 202 to read the values in index 4-7 into PCI memory buffer (0-3) of the PCI memory. In Step 5020, the software in the CPU provides SLAM engine 204 with the starting location of the table data structure in PCI memory, i.e., a pointer to buffer (0), the starting s-bus address of the table, i.e, a pointer to index 3 and the number of entries to be inserted, i.e., 4 entries including the starting and ending entries. The software sets the CAM-SLAM-DMA order bit for forward insertion. In Step 5030, SLAM engine copies the entry from buffer (0) to index (3+0) in CAM 306, the entry from PCI buffer (1) to index (3+1) in CAM 306, the entry from PCI buffer (2) to index (3+2) in CAM 306, the entry from PCI buffer (3) to index (3+3) in CAM 306. In Step 5040, CAM SLAM Engine 204 then invalidates the entry in index 7.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for processing packets, the network device comprising:
a CPU processing module for transmitting information between at least one memory location on the network device and an external CPU memory location, wherein the CPU processing module comprises:
a first engine for performing bulk transfer of information from the at least one memory location on the network device to the external CPU memory location, wherein all entries of the at least one memory location on the network device are transferred to the external CPU memory location, and
a second engine for performing bulk transfer of information from the external CPU memory location to at least one memory location on network device, wherein a plurality of entries from the external CPU memory location is transferred to the memory locations on the network device and the second engine uses a bit received from a CPU in communication with the CPU processing module to determine whether entries will be added in a forward direction or a backwards direction in the at least one memory location on the network device,
wherein the CPU processing module is configured to receive the bit that is set to one of a forward insertion when a value is being deleted from the at least one memory location on the network device or a backward insertion when a value is being added to the at least one memory location on the network device.

2. The network device of claim 1, wherein each of the at least one memory location on the network device comprises one of a Random Access Memory location or a Content Addressable Memory location.

3. The network device of claim 1, wherein a random access memory in each of the at least one memory location on the network device includes entries for storing data.

4. The network device of claim 1, wherein a content addressable memory in each of the at least one memory location on the network device includes entries for storing data and a corresponding key.

5. The network device of claim 1, wherein the second engine is configured to receive the bit from the CPU, a starting location of a table data structure in the external CPU memory location, a number of bus cycles per entry, a number of entries to be updated and the starting address of a table in the network device.

6. The network device of claim 5, wherein the number of bus cycles per entry is rounded up to the next 32-bit boundary and the CPU processing module is configured to receive a rounded-bus cycle from the CPU.

7. The network device of claim 1, wherein when the bit is set for backward insertion, a starting address of the at least one memory location on the network device is the last entry of the memory location on the network device rather than the first entry of the memory location on the network device.

8. The network device of claim 1, wherein the at least one memory location on the network device is configured to accept entries from the external CPU memory location that are aligned to a 32-bit boundary.

9. A method for processing packets in a network device, the method comprising:
performing at least one of a first bulk transfer of information from at least one memory location on the network device to an external CPU memory location, wherein all entries of the at least one memory location on the network device are transferred to the external CPU memory location, and a second bulk transfer of information from the external CPU memory location to at least one memory location on the network device, wherein a plurality of entries from the external CPU memory location is transferred to the memory locations on the network device; and
receiving a bit from a CPU in communication with a CPU processing module during the second bulk transfer to determine whether entries will be entered in a forward direction or a backwards direction in the at least one memory location on the network device,
wherein the CPU processing module is configured to receive the bit that is set to one of a forward insertion when a value is being deleted from the at least one memory location on the network device or a backward insertion when a value is being added to the at least one memory location on the network device.

10. The method of claim 9, further comprising using one of a Random Access Memory or a Content Addressable Memory for the at least one memory location.

11. The method of claim 9, further comprising receiving a starting location of a table data structure in the external CPU memory location, a number of bus cycles per entry, a number of entries to be updated and the starting address of a table in the network device.

12. The method of claim 11, further comprising rounding the number of bus cycles per entry up to the next 32-bit boundary, wherein the network device receives a rounded bus cycle from the CPU.

13. The method of claim 9, wherein when the bit is set for backward insertion, further comprising using a last entry of the memory location on the network device rather than a first entry of the memory location on the network device as the starting address of the at least one memory location on the network device.

14. The method of claim 9, further comprising accepting by the at least one memory location on the network device entries from the external CPU memory location that are aligned to a 32-bit boundary.

15. An apparatus for processing packets on a network device, comprising:

means for performing at least one of a first bulk transfer of information from at least one memory location on the network device to an external CPU memory location, wherein all entries of the at least one memory location on the network device are transferred to the external CPU memory location, and a second bulk transfer of information from the external CPU memory location to at least one memory location on the network device, wherein a plurality of entries from the external CPU memory location is transferred to the memory locations on the network device; and     means for receiving a bit from a CPU in communication with a CPU processing module during the second bulk transfer to determine whether entries will be added in a forward direction or a backwards direction in the at least one memory location on the network device, wherein the CPU processing module is configured to receive the bit that is set to one of a forward insertion when a value is being deleted from the at least one memory location on the network device or a backward insertion when a value is being added to the at least one memory location on the network device.

16. The apparatus of claim 15 wherein each of the at least one memory location on the network device comprises one of a Random Access Memory location or a Content Addressable Memory location.

17. The apparatus of claim 15 wherein when the bit is set for backward insertion, a starting address of the at least one memory location on the network device is the last entry of the memory location on the network device rather than the first entry of the memory location on the network device.

18. The apparatus of claim 15 wherein the at least one memory location on the network device is configured to accept entries from the external CPU memory location that are aligned to a 32-bit boundary.

* * * * *

UNITED STATES PATENT AND TRADEMARK OFFICE
CERTIFICATE OF CORRECTION

PATENT NO.         : 7,739,423 B2                                                    Page 1 of 1
APPLICATION NO.    : 11/082976
DATED              : June 15, 2010
INVENTOR(S)        : Vamsi Tatapudi et al.

It is certified that error appears in the above-identified patent and that said Letters Patent is hereby corrected as shown below:

On Title page, in field (54), in "Title", in column 1, line 1, after "ON" insert -- A --.

In column 1, line 1, after "ON" insert -- A --.

Signed and Sealed this

Twenty-first Day of December, 2010

David J. Kappos
*Director of the United States Patent and Trademark Office*